W. N. SPRINGER.
CULTIVATOR MECHANISM.
APPLICATION FILED MAY 17, 1916. RENEWED DEC. 3, 1920.
1,384,411.
Patented July 12, 1921.
2 SHEETS—SHEET 1.
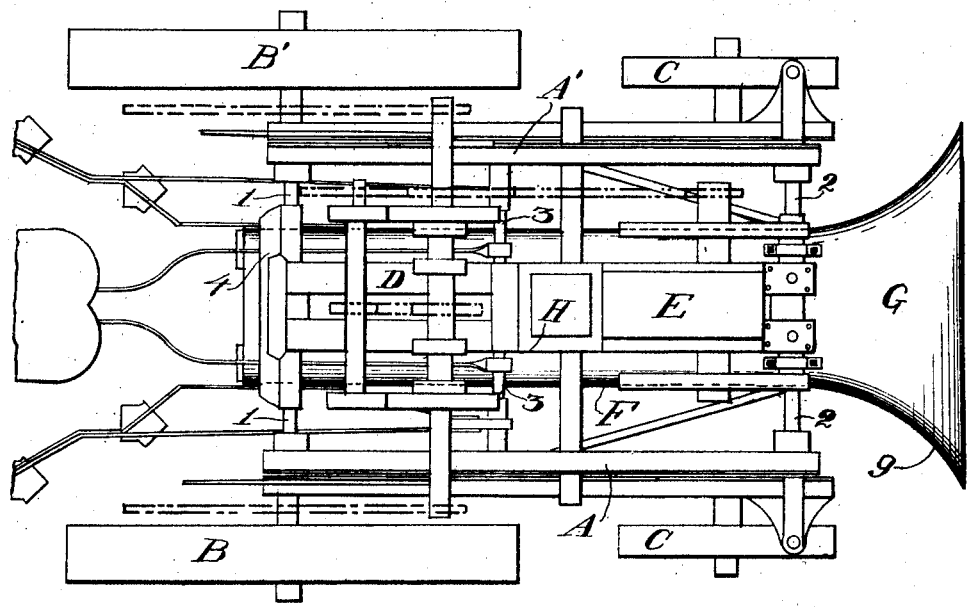
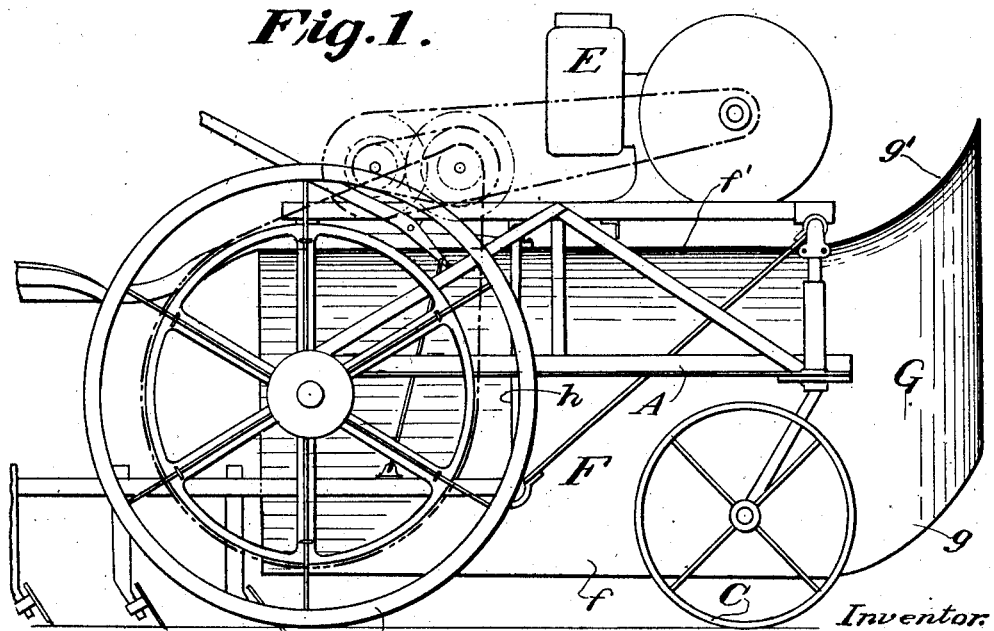

W. N. SPRINGER.
CULTIVATOR MECHANISM.
APPLICATION FILED MAY 17, 1916. RENEWED DEC. 3, 1920.

1,384,411.

Patented July 12, 1921.

Inventor
William N. Springer
H. T. Bliss
Attorney.

UNITED STATES PATENT OFFICE.

WILLIAM N. SPRINGER, OF SOUTH BEND, INDIANA.

CULTIVATOR MECHANISM.

1,384,411. Specification of Letters Patent. Patented July 12, 1921.

Application filed May 17, 1916, Serial No. 98,105. Renewed December 3, 1920. Serial No. 428,152.

*To all whom it may concern:*

Be it known that I, WILLIAM N. SPRINGER, a citizen of the United States, residing at South Bend, in the county of St. Joseph and State of Indiana, have invented certain new and useful Improvements in Cultivator Mechanisms, of which the following is a specification, reference being had therein to the accompanying drawing.

This invention relates to improvements in cultivator mechanisms, particularly to cultivators of the straddle row class which are propelled by engines and constructed in such way as to leave the front ends of the implements exposed and liable to contact with growing plants. The object is to guard against breaking or marring young trees, shrubs, berry plants, or the like, when the machine is used in nursery work, and to shield stalks, stems, leaves, and the like, of the plants growing in rows, such as corn plants, when they are being cultivated.

Figure 1 is a plan view of a mechanism embodying my improvements;

Fig. 2 is a side elevation;

Figure 4:
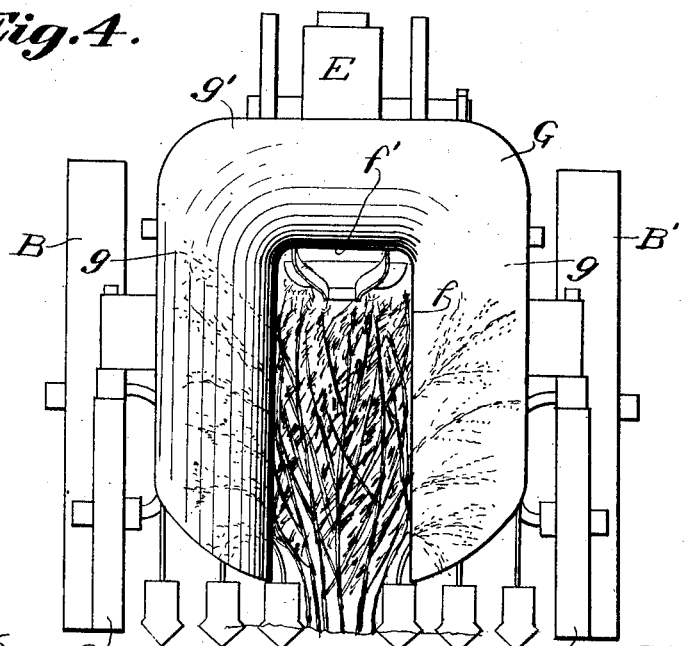
Fig. 4 is a rear view.
Figure 6:
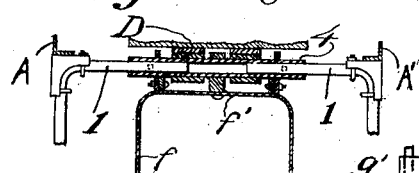
Figure 7:
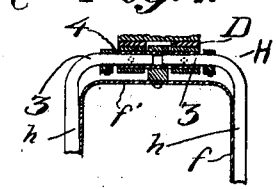
Figure 3:
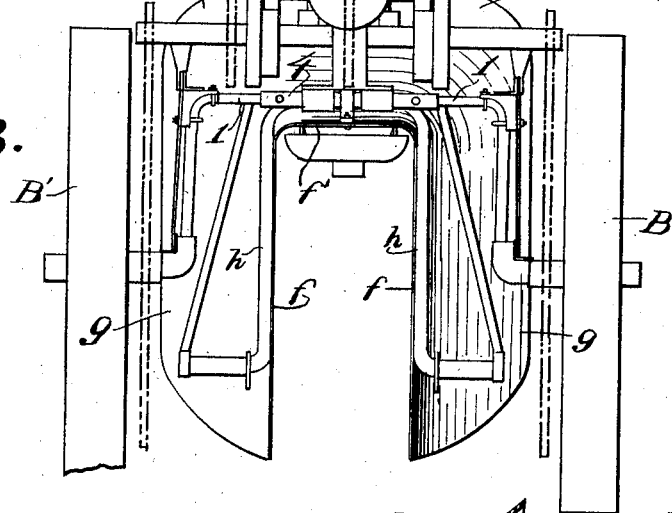
Fig. 3 is a front elevation.
Figure 5:
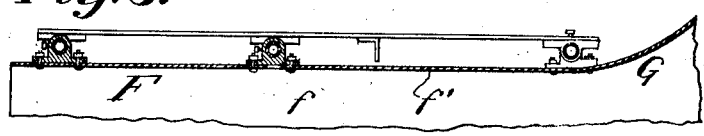
Fig. 5 is a fragmentary, central, vertical longitudinal section showing the shield and adjacent supporting parts.

Figs. 6 and 7 are fragmentary transverse sections within the frame bars 1, 1, and 3, 3, respectively.

In the drawings I have shown or indicated enough of the parts of a power-propelled cultivating implement to convey an understanding of how my improvements are to be applied thereto. And inasmuch as there can be variation, and a wide choice of detail in the construction of the operative parts of the tool, it is not necessary to describe all of those indicated. Suffice it to say that in the mechanism shown there is a main framework formed of two elements A and A', which are laterally adjustable as to each other. This frame is supported at the rear on the supporting and traction or driving wheels B, B', (by which it is also propelled,) and which also can be utilized for steering it. At the front end the frame is supported upon wheels C, C. The framework comprises horizontal cross bars 1, 1, at the rear, 2, 2 at the front, and 3, 3 at intermediate positions. These are, respectively, fitted in tubes or female elements 4—4 carried by a central frame, and by means of them the side frame elements can be moved outward or inward for different adjustments. After adjustment they can be set firmly in position by set screws or equivalent devices for fastening them to the connecting and holding devices 4, 4.

Upon the central frame, indicated as a whole by D, is mounted the engine E. The power shafting of the engine is connected to the rear driving and steering wheels B, B by drive chains.

In another application, to wit, Serial No. 45,968, filed August 17, 1915, I have set forth a power-propelled cultivating mechanism with substantially all of the details illustrated, and reference can be made thereto.

I have found that when an implement of this class is propelled by power devices mounted directly on the machine and pushing it forward, in contradistinction from ordinary propulsion by draft animals, it is very advantageous to provide means that will prevent stalks, stems and limbs of growing plants from being caught in, or struck by, the parts of the mechanism. The framework is constructed of bars, horizontal and vertical, braces, brackets and bolts, and the ground-working tools, themselves, have projecting parts which are apt to catch and become tangled with, or strike against, the stems, limbs, stalks, etc., referred to.

I have combined with the parts above mentioned a guard or shield. It is composed of a long trunk-like section F extending from a vertical transverse plane near the rearmost shovels or tools forward to a plane near the front end, and a front section G.

The rear box-like part F has vertical walls *f*, *f* and a top wall *f'*. It is formed of a sheet of metal bent to provide the walls specified. The top wall or part *f'* is secured to the central frame D. The vertical walls *f*, *f* extend downward in longitudinal vertical planes just inside of the innermost bars comprised in the framework which supports the tools. These bars are generally the vertical legs *h*, *h* of an arch frame H which have the above described intermediate adjustable horizontal arms 3, 3. These legs *h*, *h* support the spindles and pipe boxes to which the tool gangs are attached.

The walls *f*, *f*, lying inside of these bars, form a practically unbroken chamber with smooth surfaces extending from the front of the machine to its rear.

The front section G of the shield has the outwardly curved or flaring walls $g$, $g$, and the upwardly inclined or curved top $g'$. These walls $g$, $g$, slope inward and downward until they reach the planes of the walls $f$, $f$ and $f'$.

In the bell-shaped mouth or flared front end G there are also smooth surfaces forming extensions of the inner surfaces of the parts $f$ and $f'$.

The walls of the shield are carried as low as practicable so as to guide upward and inward stalks, stems or limbs that tend to droop or sag outward and downward.

The manner in which the devices operate will be readily understood. The operator, by the use of the proper manually controlled devices, applies power from the engine to the ground wheels and causes the implement to advance. As it moves forward, the stalks of the row of plants, or the limbs of the tree, bush or shrub, which it is desired to cultivate, are deflected upward and inward to a vertical position; the shield or guard box smoothly slips along by their sides, and they are so held as not to be struck by, or caught among, the bars, braces, or other projecting parts of the mechanism.

As the machine is self-steering, that is to say, as its parts are so arranged that the wheels and cultivating tools can be turned so as to run in toward, or turned so as to travel away from, the roots of a tree or shrub, it is very advantageous to be able to pick up the stalks, stems or limbs and bring them to the center of the machine, and to a more or less upright position, as above described, to save them from injury from either the tools or the wheels.

A cultivating implement of this class, which is propelled from points behind its front end, is available for much work in which the ordinary horse draft tools cannot be employed. This is particularly true in respect to the work of cultivating the plants in a nursery or orchard. Many of the bushes and shrubs tend to spread widely as they grow, and when the implements are drawn by horses with tongues or draft devices in the front of the implements, the animals tend to tramp upon and break the plants. With the mechanism of the sort herein shown the cultivating tools can be brought close into the roots without endangering them.

The box-like section of the plant guiding and guarding device is secured to the central frame element which carries the engine and, therefore, the side elements of the frame can be laterally adjusted as circumstances require, without affecting the position of the box guide.

While I prefer to have not only the front or forward projecting flared section to pick up the plants and bring them to the central longitudinal lines of the machine, and also to have a box section which is elongated well to the rear of the implement, I do not limit myself to details in this respect. For some plants a much shorter box section F can be used, and in some cases it is sufficient to merely pick up the drooping and sagging limbs or stems and bring them to the center, particularly where a short tool frame is used in contrast with the rearwardly elongated gangs which are shown in the drawings. The desideratum is to pick up the limbs or stems and to cause them to move inward out of the lines of the tools.

Nor do I limit myself to a box-like device which has continuous guide walls. Some plants require cultivation whose limbs or stems are such that narrower bars or lattice bars can be used, provided they are sufficient to bring the plants in to central vertical planes and hold them long enough for the tools to pass.

What I claim is:

1. A cultivating implement adapted to cultivate the soil adjacent to bushes or young trees, having, in combination, a framework having high arches over the plant row, earth-working tools carried by the frame and separated to have an open space on the central longitudinal lines of the machine, power-propelling devices on the frame applying power to the traction wheels behind the front end of the frame, and a guide projecting forward from the frame and adapted to engage with the plant limbs and stems and guide them and deflect them inward and upward from the longitudinal planes of the tool paths to the said central open space and arranged to leave said space unobstructed from the ground to a horizontal plane near the arches.

2. The combination of the wheel supported framework having relatively elevated front and rear arches extending over the plant row, the tool gangs spaced apart at the central longitudinal lines of the machine, the power devices on the framework for propelling the frame and the tools, the shield arranged to provide an unobstructed central passageway extending from the ground to a horizontal plane near the arches and having a flaring front end projected forward from the frame and arranged to press the plants inward from the lines of travel of the tools to the longitudinal lines of the said central passageway.

3. The combination of the frame having high arches at the front and rear extending over the plant row, the wheels, the spaced tool gangs advanced by the frame, the engine on the frame, power-transmitting devices connecting the engine to the ground wheels, the plant guard having vertical walls secured to the frame rigidly relatively to the arches and spaced apart to follow the sides of the rows of plants, and having the flaring guideway in front of the tool gangs arranged to bring the stalks and limbs inward toward the center of the machine to the space between the vertical walls.

4. The combination of the laterally extensible framework having arches with extensible top elements adapted to travel over the tops of the plants, the traction ground wheels for propelling the frame, the tools arranged to travel on each side of the plants, the engine on the frame connected to the traction wheels, the plant guiding and guarding device having a box-like section secured rigidly to the frame and adapted to be held permanently, in the center, transversely of the frame under all extension adjustments, and the flaring guide section projecting forward from the arches and communicating with the box-like section.

5. The combination of the frame having a central element and two laterally adjustable elements, the ground wheels which support the frame including traction wheels, the power devices for rotating the traction wheels, and the guide supported on the central frame element and projecting forward from the frame and adapted to engage with and guide the plant stems and limbs toward the central longitudinal plane of the machine.

In testimony whereof, I affix my signature, in presence of two witnesses.

WILLIAM N. SPRINGER.

Witnesses:
GEORGE E. WOLF,
HELEN JANOWSKI.